(12) United States Patent
Andrewlavage, Jr.

(10) Patent No.: US 6,616,025 B1
(45) Date of Patent: Sep. 9, 2003

(54) AUTOMATED FLAT GLASS SEPARATOR

(75) Inventor: Edward F. Andrewlavage, Jr., Danville, KY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/653,617

(22) Filed: Aug. 31, 2000

(51) Int. Cl.⁷ .................................................. B26F 3/00
(52) U.S. Cl. ...................................... 225/96.5; 225/103
(58) Field of Search .......................... 225/96, 965, 103, 225/101, 100, 98

(56) References Cited

U.S. PATENT DOCUMENTS

| | | | | |
|---|---|---|---|---|
| 2,538,901 A | * | 1/1951 | Fancher | 225/103 |
| 2,595,862 A | * | 5/1952 | Lavander | 225/103 |
| 3,244,338 A | * | 4/1966 | Ritter, Jr. et al. | 225/96.5 |
| 3,279,664 A | * | 10/1966 | Lynch | 225/96.5 |
| 3,286,893 A | * | 11/1966 | Zellers | 225/2 |
| 3,388,843 A | * | 6/1968 | Umbel | 225/96 |
| 4,088,255 A | * | 5/1978 | DeTorre | 228/98 |
| 4,256,246 A | * | 3/1981 | Kindel | 225/103 |
| 4,289,261 A | * | 9/1981 | Dahlberg | 225/2 |
| 4,316,565 A | * | 2/1982 | Hodgkinson et al. | 225/99 |
| 4,558,622 A | * | 12/1985 | Tausheck | 225/96.5 |
| 5,133,491 A | * | 7/1992 | Correll et al. | 225/1 |
| 6,218,793 B1 | * | 4/2001 | Bando | 225/96.5 |

* cited by examiner

Primary Examiner—Boyer D. Ashley
(74) Attorney, Agent, or Firm—Maurice M. Klee

(57) ABSTRACT

Apparatus and methods are provided for separating a pane (11) of a brittle material from a moving ribbon (13) of the material without contact between the newly-formed leading edge of the ribbon and the newly-formed trailing edge of the pane. The apparatus includes a pane engaging assembly (15), a transporter (29), and a connector assembly (31) which together ensure that the pane (11) and the sheet (13) do not contact each other once separation occurs. In this way, edge chipping and the resulting occurrence of surface defects on the separated pane are decreased.

10 Claims, 14 Drawing Sheets

AUTOMATED FLAT GLASS SEPARATOR

FIELD OF THE INVENTION

This invention relates to glass manufacturing and, in particular, to the problem of separating panes of glass from a moving ribbon of glass without excessive generation of glass chips through edge contact and resulting damage.

More generally, the invention relates to separating panes of any brittle material from a moving ribbon of the material. For ease of presentation, however, the following discussion is in terms of glass manufacturing, it being understood that the invention as defined in the appended claims is not so limited except for those claims which specify that the brittle material is glass.

BACKGROUND OF THE INVENTION

Specialized glasses such as those used as substrates in the manufacture of liquid crystal displays and similar devices have demanding standards regarding surface defects. One source of such defects is glass chips generated during the separation of panes of glass from a moving ribbon of glass.

In the past, such separation has been performed manually using the following steps. First, a separation line (score line) was formed in the ribbon of glass using an automated moving scribe/moving anvil assembly. Then, the operator attached a vacuum cup array to the glass below the score line and applied a bending moment to the glass to cause it to break at the score line and thus form the desired glass pane. This breaking produced a newly-formed leading edge on the moving ribbon and a newly-formed trailing edge on the glass pane.

To avoid damage to these newly-formed edges, the operator would endeavor to immediately move the pane away from the oncoming leading edge of the ribbon. As will be evident, this was not easy to do because, among other things, it was difficult to apply the same bending moment to the pane each time it was to be separated form the moving ribbon. Different bending moments resulted in different orientations for the pane at the time of separation, making it even more difficult to avoid edge contact. Different bending moments also affect the break signature or quality of the break independent of edge contact. Moreover, even with identical bending moments, individual panes of glass can separate at different angles making the avoidance of edge contact even more difficult to achieve.

As a result, only highly skilled and trained operators could perform the pane separation procedure, and even with such operators, edge contact and break signature variation occurred leading to rejected panes.

SUMMARY OF THE INVENTION

In view of the foregoing, it is an object of the present invention to provide methods and apparatus for overcoming the problem of edge contact during the separation of a pane of a brittle material from a moving ribbon of the material. It is also an object of the invention to provide methods and apparatus for applying a repeatable, uniform bending moment to a pane of a brittle material to separate the pane from a moving ribbon of the material.

To achieve these and other objects, the invention in accordance with one of its aspects provides apparatus for separating a pane (11) of a brittle material from a moving sheet (13) of the material along a separation line (47), said pane and said sheet having a width W, said pane when separated having a length L, said movement of the sheet being described by a vector $\overline{V}_{sheet}$, said apparatus comprising:

(a) a pane engaging assembly (15) adapted to releasably engage the moving sheet within an area defined by the length L and width W of the to-be-separated pane;

(b) a transporter (29) adapted to bring the pane engaging assembly into engagement with the moving sheet and to rotate that assembly about an axis which substantially coincides with the separation line, said rotation causing the pane to separate from the sheet; and (c) a connector assembly (31) for connecting the pane engaging assembly and the transporter so that the pane engaging assembly moves relative to the transporter upon separation of the pane from the moving sheet so that the pane and the sheet do not contact each other once separation occurs.

In accordance with other aspects, the invention provides a method for separating a pane (11) of a brittle material from a moving sheet (13) of the material along a separation line (47), said pane and said sheet having a width W, said pane when separated having a length L, said movement of the sheet being described by a vector $\overline{V}_{sheet}$, said method comprising:

(a) releasably engaging the moving sheet (13) within an area defined by the length L and width W of the to-be-separated pane;

(b) rotating the to-be-separated pane about an axis which substantially coincides with the separation line, said rotation causing the pane to separate from the sheet; and (c) moving the separated pane relative to the moving sheet either passively using gravity as the motive force (i.e., the sole motive force) or actively using at least one of a hydraulic force, a mechanical spring force, a pneumatic force, and a vacuum, either alone or in combination with gravity, as the motive force, so that the pane and the sheet do not contact each other once separation occurs.

FIG. 1 illustrates the operating principles of the invention. As shown therein, pane engaging assembly 15 has been brought into engagement with a moving ribbon 13 of a brittle material. As indicated by arrows 51, both the pane engaging assembly and the ribbon of brittle material are moving with substantially the same speed in substantially the same direction at the instant shown, i.e., they each have substantially the same vector velocity. As also shown in the figure, a score line 47 has been formed in the brittle material and a stop 49 is in position so that a bending moment can be applied about the score line. The score or separation line is substantially perpendicular to the vector $\overline{V}_{sheet}$ and defines the length L of the to-be-separated pane. It can be formed by a scoring assembly 21 of the type discussed below or other scoring assemblies known in the art.

Arrows 53 and 55 represent the forces that, in accordance with the invention, are brought to bear so that (1) the pane becomes separated from the ribbon and (2) the pane immediately moves away from the ribbon once separation has been achieved.

In particular, arrow 53 represents a bending moment that is applied to the pane through the pane engaging assembly and causes the pane to separate from the ribbon at the score line. As can be seen in FIG. 1, this bending moment is applied by rotating the pane engaging assembly about score line 47. In this way, a pure bending moment is applied to the score line which causes it to open up and drive through the sheet. As discussed in detail below, transporter 29 acting through connector 31 produces this rotation (see FIGS. 4–5).

Arrow 55 represents a force which moves the separated pane away from the still advancing ribbon. The force can be an active force, a passive force, or a combination of an active and passive force. FIG. 1 shows the system in a horizontal orientation in which case the force needs to be an active force, e.g., a hydraulic force, a mechanical spring force, a pneumatic force, a vacuum, or the like. For a vertical orientation, the pane can move passively away from the ribbon under the force of gravity.

Force 55 acts on the separated pane through the cooperation of pane engaging assembly 15, transporter 29, and connector assembly 31 (see, for example, FIGS. 5 and 12). For active systems, the connector assembly allows the active force to produce relative motion between the pane engaging assembly/separated pane combination and the transporter. Such an active force can originate from, for example, a force generator, e.g., a pneumatic cylinder, mounted on the connector assembly, the transporter, and/or some other part of the apparatus or its housing. In the case of a passive system which uses gravity as a motive force, the connector assembly allows the pane engaging assembly/separated pane combination to undergo a controlled "fall" relative to the transporter so that the pane falls away from the moving ribbon.

It should be noted that through the application of bending moment 53, some rotation of the pane about score line 47 will take place and thus force 55 will no longer be parallel to velocity vector 51 when it performs its function of moving the pane away from the leading edge of the moving ribbon. For example, for a typical liquid crystal display glass having a thickness of about 0.7 millimeters with a score line which penetrates 10% or less of the thickness of the sheet, separation will normally take place at an angle greater than zero and less than about 10°. All that is required, however, is that force 55 has a component in the direction of vector 51 that is sufficient to move the pane away from the leading edge of the ribbon once separation has occurred, not that the force is parallel to vector 51.

Additional features and advantages of the invention are set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention. The drawings are not intended to indicate scale or relative proportions of the elements shown therein.

Figure 1:
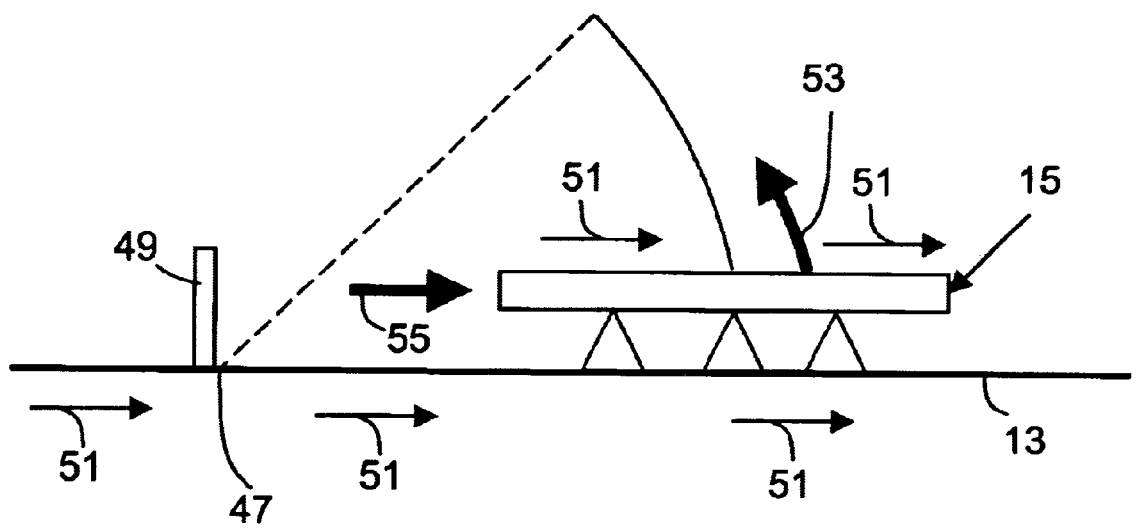
FIG. 1 is a schematic drawing illustrating the operating principles of the invention.

The reference numbers used in the drawings correspond to the following:
11 separated pane
13 moving sheet or ribbon
15 pane engaging assembly
17 frame
19 sheet engaging members
21 scoring assembly
23 anvil
25 scribe
27 transporter for scribe
29 transporter
31 connector assembly
33 connecting member
35 connecting member
37 linear bearing assembly
37a linear bearing
37b linear support rail
39 reset assembly
41 manufacturing line which produces ribbon 13
43 pane transport system
45 pane grippers
47 separation line
49 stop
51 arrows representing the vector $\overline{V}_{sheet}$
53 arrow representing the bending moment used to separate a scored pane from the moving sheet
55 arrow representing a motive force for moving a separated pane away from the moving sheet
57 arrows representing linear motions of transporter
59 arrow representing rotational motion of transporter

DESCRIPTION OF THE PREFERRED EMBODIMENTS

As discussed above, the present invention relates to the separation of glass panes from a moving ribbon of glass without allowing contact of the newly-formed leading edge of the ribbon with the newly-formed trailing edge of the pane. The invention also relates to applying a repeatable uniform bending moment to a pane of a brittle material so as to minimize variations in the break signature of panes formed from the ribbon.

FIGS. 2–11 show a representative sequence of steps for forming such a pane in accordance with the invention. In each of these figures, the reference number 41 represents a glass manufacturing line, e.g., an overflow downdraw glass manufacturing line for producing LCD glass, and the reference number 43 represents a pane transport system which includes pane grippers 45 for moving a separated pane to further stages of the manufacturing process, e.g., to an edging station, an inspection station, etc.

Figure 2:
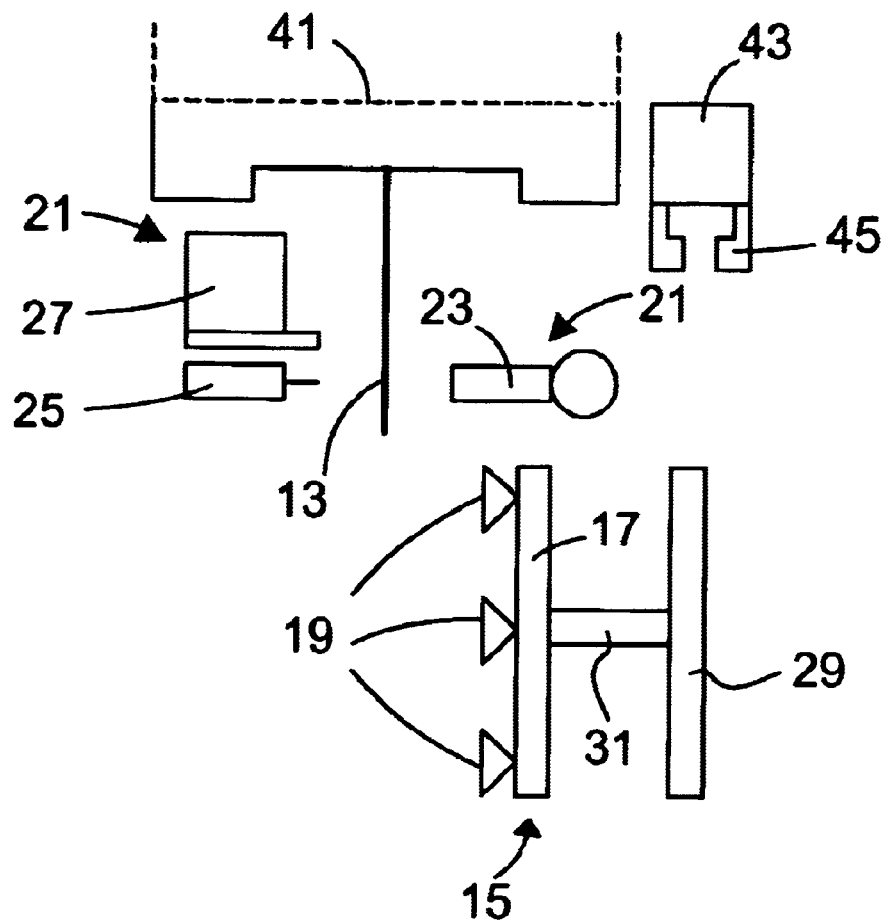
FIGS. 2–11 are a set of schematic drawings illustrating the separation of a pane from a moving ribbon in accordance with the invention.

FIG. 2 shows the overall system at start-up with glass ribbon 13 having just entered scoring assembly 21, which comprises anvil 23, scribe 25, and scribe transporter 27. As is conventional, the scoring assembly is preferably of the moving scribe/moving anvil type, although other types of scoring systems can be used if desired, e.g., laser based systems.

Figure 3:
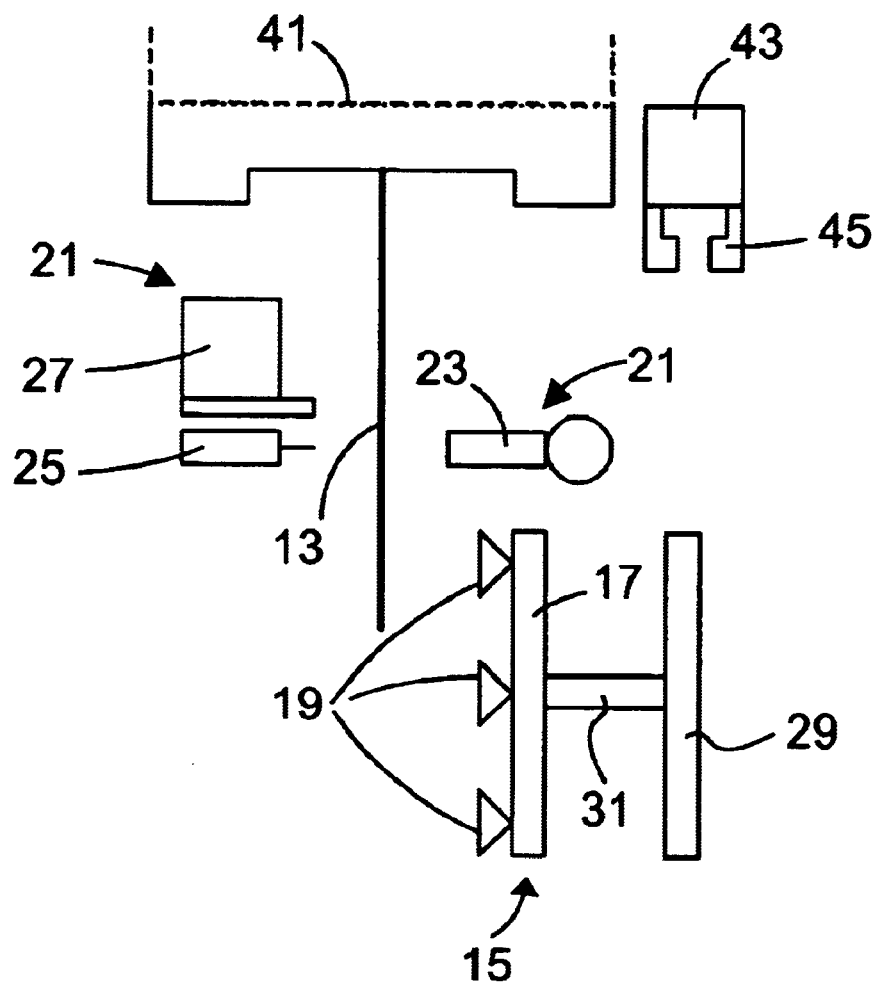
Figure 4:
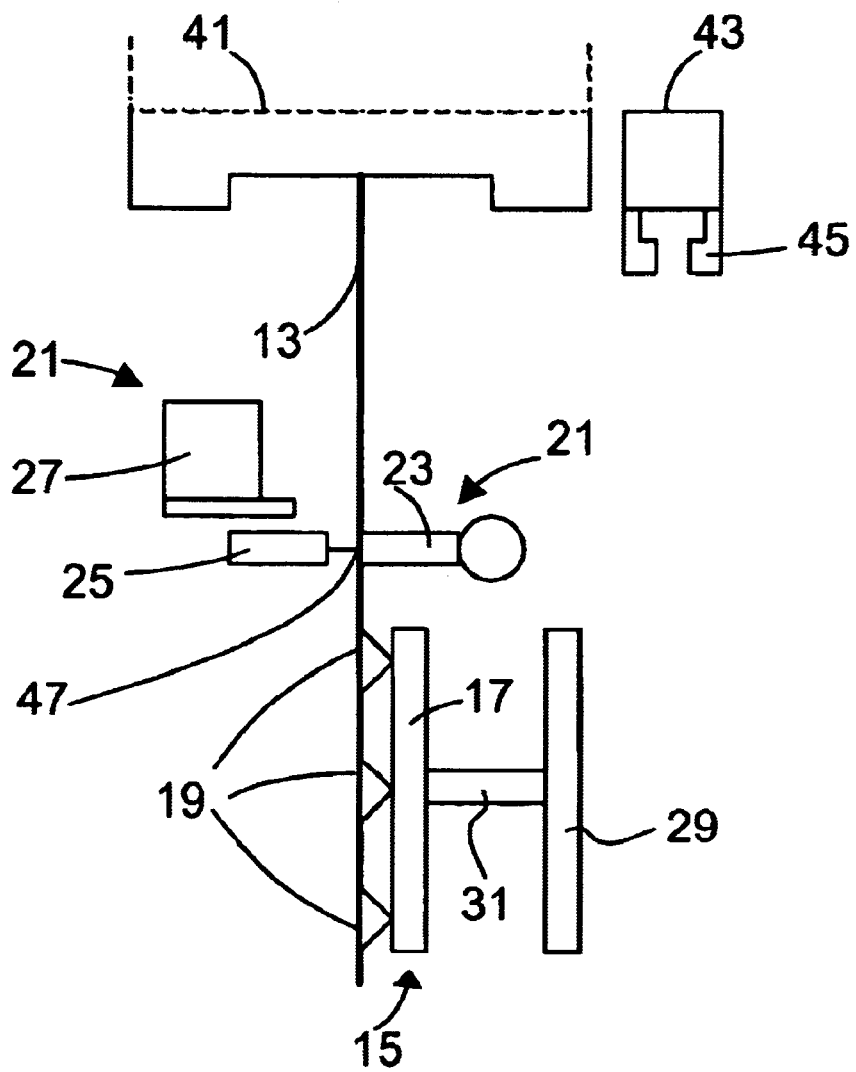
Figure 13:
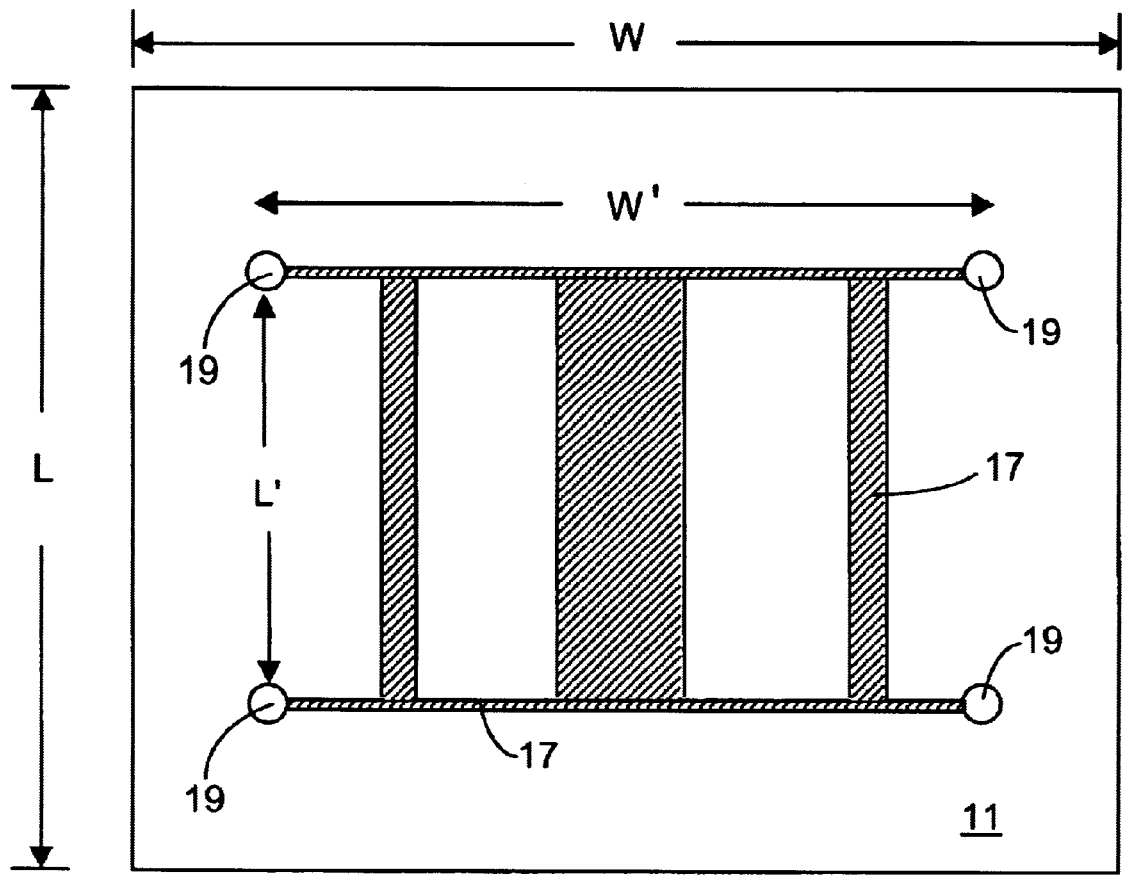
FIG. 13 is a schematic drawing illustrating components of the pane engaging assembly of the invention.

FIG. 3 shows the further progression of ribbon 13 beyond the scoring assembly and into the region of the pane engaging assembly 15. The pane engaging assembly includes frame 17 which carries sheet engaging members 19. FIG. 13 shows a preferred form for frame 17. As shown in this figure, four pane engaging members 19 are deployed at the four corners of the frame, with the width W' and length L' of the frame being less than the width W and length L of pane 11. The pane engaging members 19 are preferably soft vacuum suction cups, although other apparatus for engaging a sheet of glass, e.g., clamps, can be used if desired. More or less than four pane engaging members can be used as desired.

Figure 14:
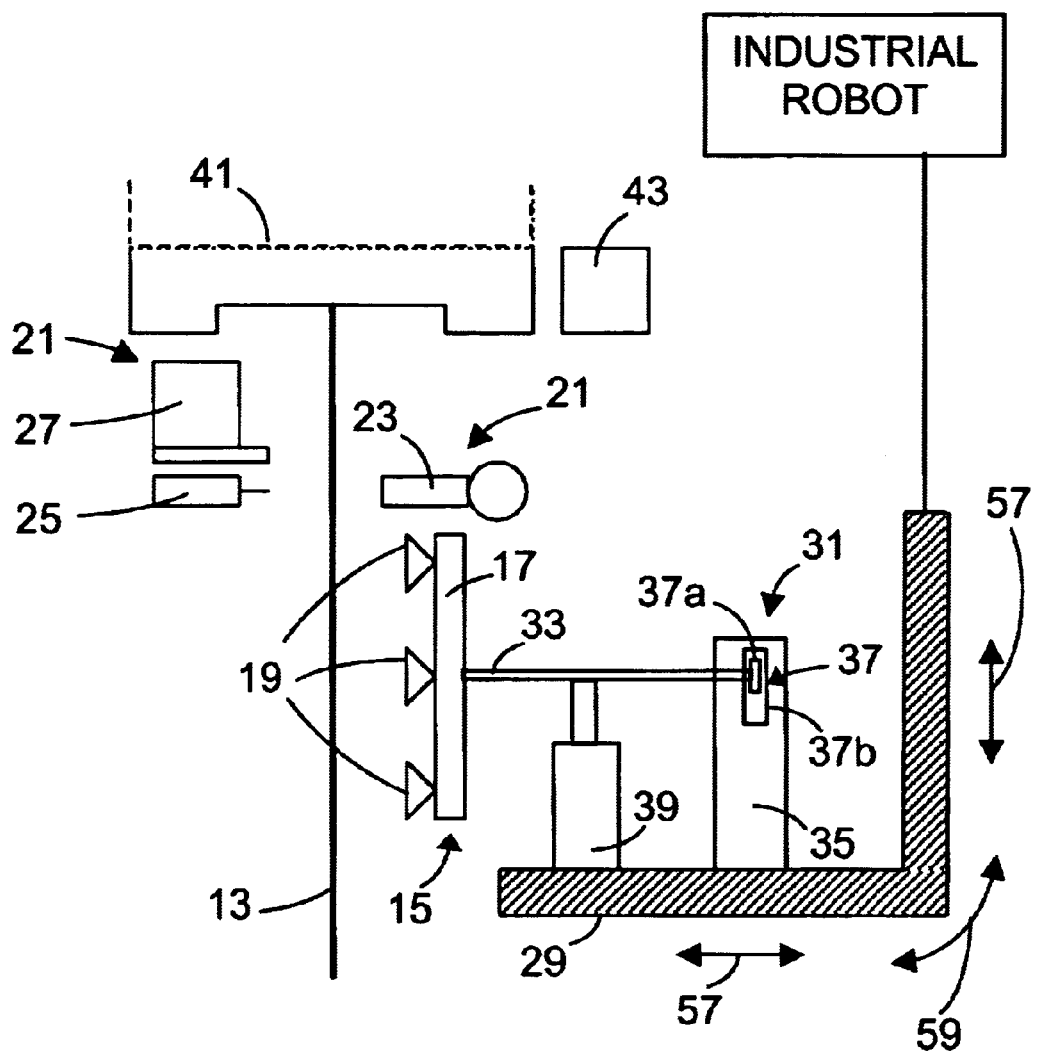
FIG. 14 shows an embodiment of the apparatus of FIG. 12 in which the transporter employs an industrial robot.

Pane engaging assembly 15 is carried by transporter 29 through connector assembly 31. Transporter 29 can be an industrial robot (see FIG. 14) and/or fixed automation for providing linear and rotational motion to the pane engaging assembly and the connector assembly (see arrows 57 and 59 in FIGS. 12 and 14). As discussed above, for the passive, gravity-based embodiment of FIGS. 2–11, connector assembly 31 performs the important function of allowing the pane engaging assembly/separated pane combination to undergo a controlled "fall" relative to the transporter and thus the leading edge of ribbon 13 once separation has occurred.

Figure 12:
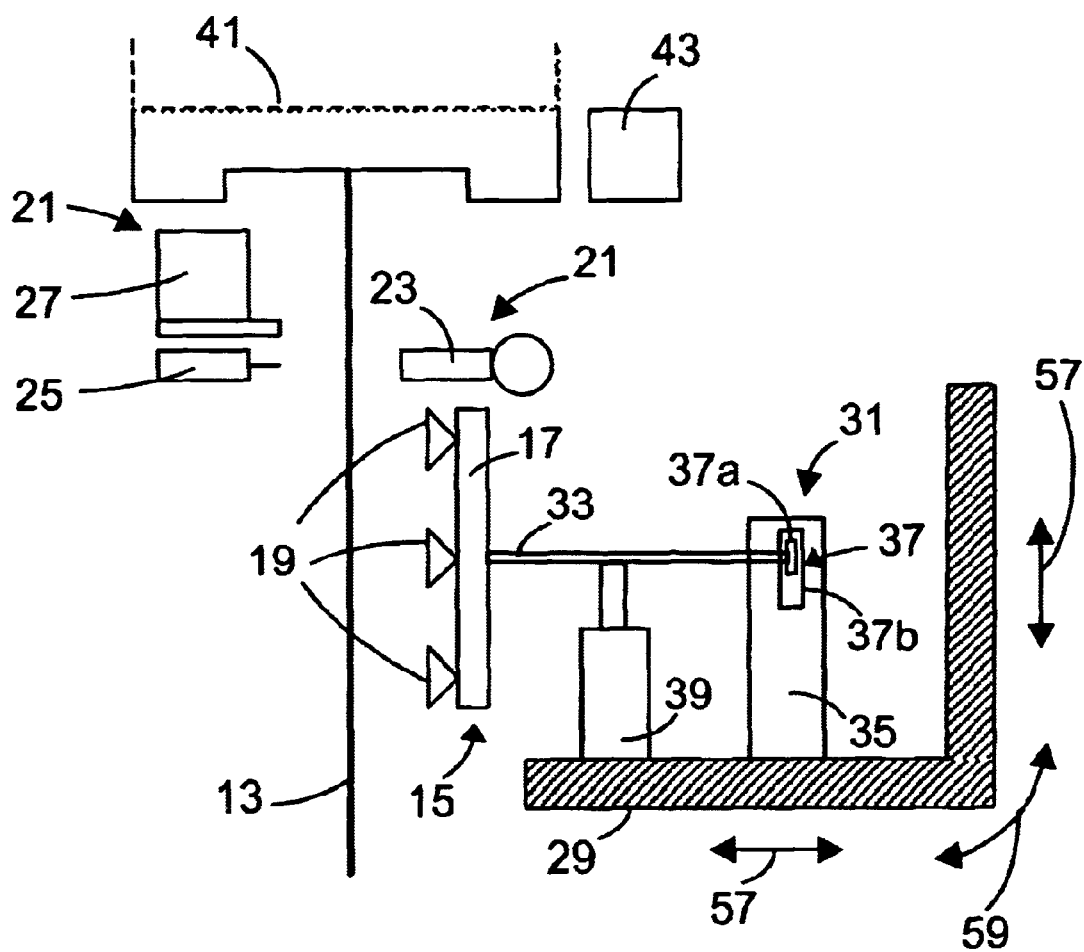
FIG. 12 is a schematic drawing illustrating components of the connector assembly of the invention.

FIG. 12 schematically illustrates a preferred construction for connector assembly 31. As shown therein, the assembly includes connecting member 33 attached to frame 17 and connecting member 35 attached to transporter 29. The connecting members are joined through a linear bearing assembly or block 37 which includes a pair of linear bearings 37a and a corresponding pair of linear support rails or guides 37b, one of each of which is schematically illustrated in FIG. 12.

The linear bearing assembly confines the motion of frame 17 to the axis defined by linear rails 37b, said axis being substantially perpendicular to score line 47. Since the linear bearing assembly rotates with transporter 29, the assembly is automatically ready to move along the angle of the pane at the moment of separation irrespective of variations in that angle from pane to pane. Other structures for producing the desired motion of frame 17 can of course be used in the practice of the invention, including the active systems discussed above in connection with FIG. 1. Generally, such structures will be of the linear guide or linear shaft type, although mechanical linkages producing other types of motion, e.g., motion along an arc, can be used if desired.

FIG. 12 also shows reset assembly 39 which is used to move linear bearings 37a from a lower position (second position) to an upper position (first position) along linear rails 37b. The reset assembly can, for example, be a pneumatic cylinder. Other means for moving linear bearings 37a along linear rails 37b can, of course, be used if desired, e.g., a hydraulic powered system, an electrical motor driving a mechanical linkage, and the like. In addition to resetting the location of the pane engaging assembly, the reset assembly can also limit the downward travel of the combination of that assembly and a separated pane of glass. In practice, it has been found that a controlled "fall" of approximately a half an inch to an inch (15–25 millimeters) is sufficient to avoid edge contact problems.

If active separation is desired, the reset assembly can pull on connecting member 33, rather than simply allowing that member to fall under the force of gravity. For example, if only passive separation is desired and a pneumatic cylinder is used as the reset assembly, then one needs only to release the pressure in the cylinder once the pane engaging assembly has engaged the sheet. On the other hand, if full or partial active separation is desired, rather than merely releasing the pressure in the cylinder, a vacuum can be applied to the cylinder so that it actively pulls the pane away from the ribbon once separation has occurred.

The reset assembly will typically include proximity switches or similar devices for providing information to an overall control system (not shown) regarding the location of the pane engaging assembly. In particular, information that pane engaging assembly 15 has moved downward relative to transporter 29 can be used as a signal to cease the rotation of the transporter since such downward movement means that the pane has separated from the ribbon.

Returning to the sequence of FIGS. 2–11, FIG. 4 shows the formation of separation line 47 in glass ribbon 13 by scribe 25. As also shown in this figure, pane engaging members 19 have engaged the sheet. This engagement can take place either before or after the sheet has been scored. The engagement can be achieved by using a hard placement of the pane engaging members with respect to the sheet in combination with the use of sufficiently soft engaging members, e.g., soft vacuum suction cups, that will not cause undue motion of the sheet.

If the engagement is done after scoring, the engagement should not create a bending moment about the score line which will cause the pane to prematurely separate from the sheet. That is, the engagement needs to be accomplished while maintaining the plane of the glass. A reduced bending moment during engagement can be achieved by controlling the distance between the uppermost pane engaging member and the score line. In practice, a distance of 150 millimeters has been found to work successfully for 0.7 and 1.1 millimeter LCD glass. Other distances can of course be used if desired.

Whether pane engaging assembly 15 is engaged with the pane before or after scoring, for a fully passive system, the assembly needs to be attached to the pane before the bending moment which separates the pane from the ribbon is applied. As long as the plane of the glass is maintained, ribbon 13 can support substantial weight even when scored. The sheet only loses its strength when the score line opens up and is driven through the sheet by the application of a bending moment which creates a tension/compression gradient in the glass.

Figure 5:
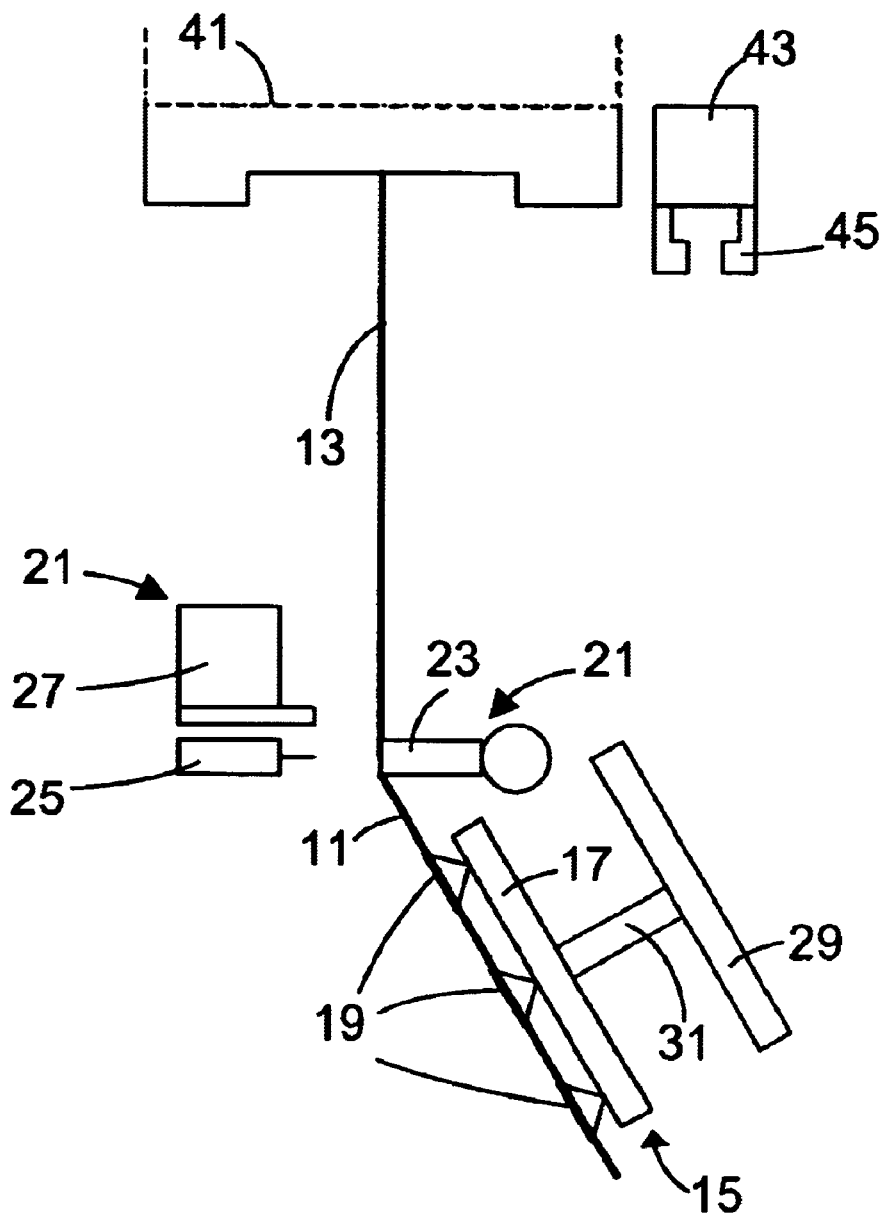
Figure 6:
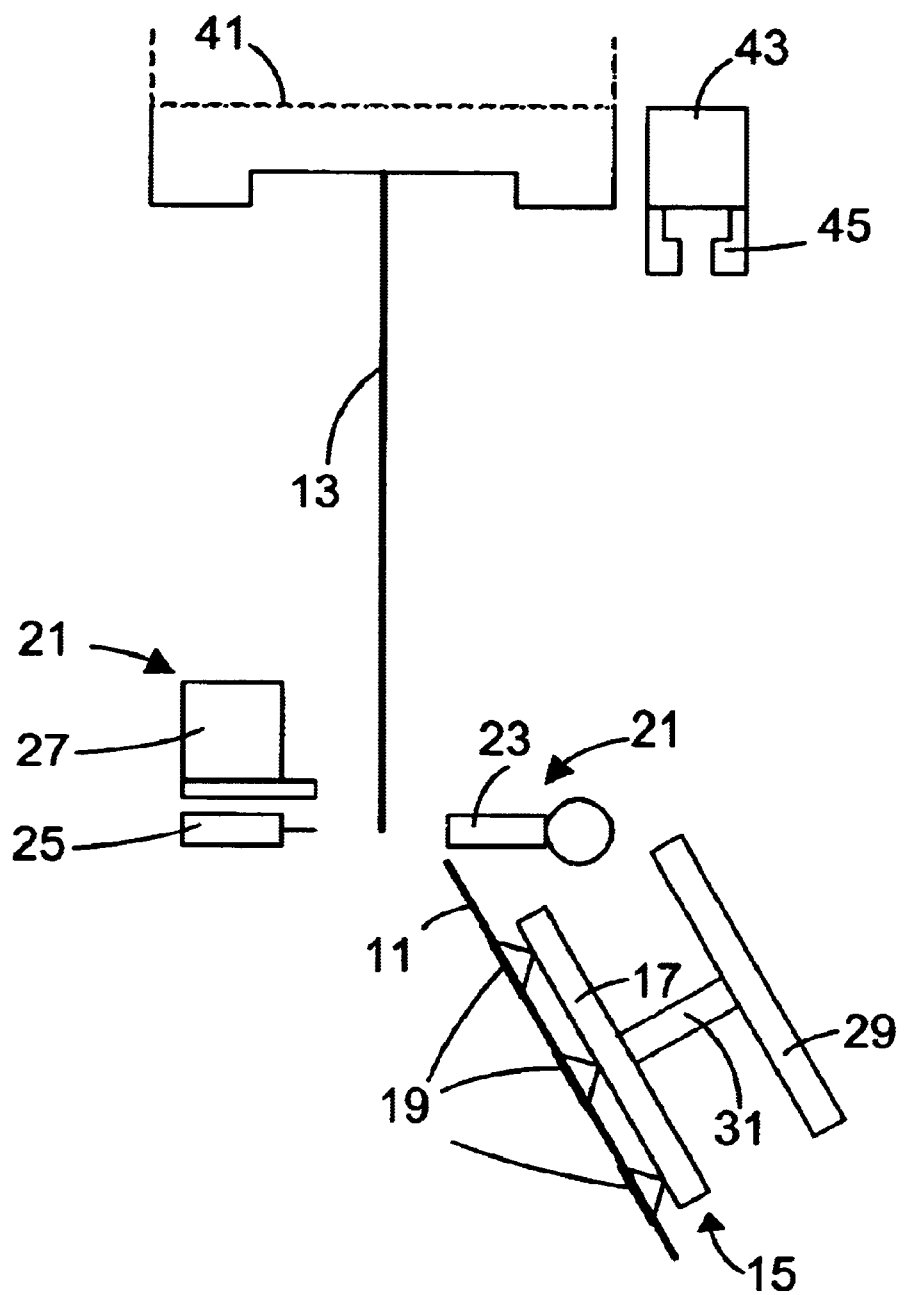
Figure 7:
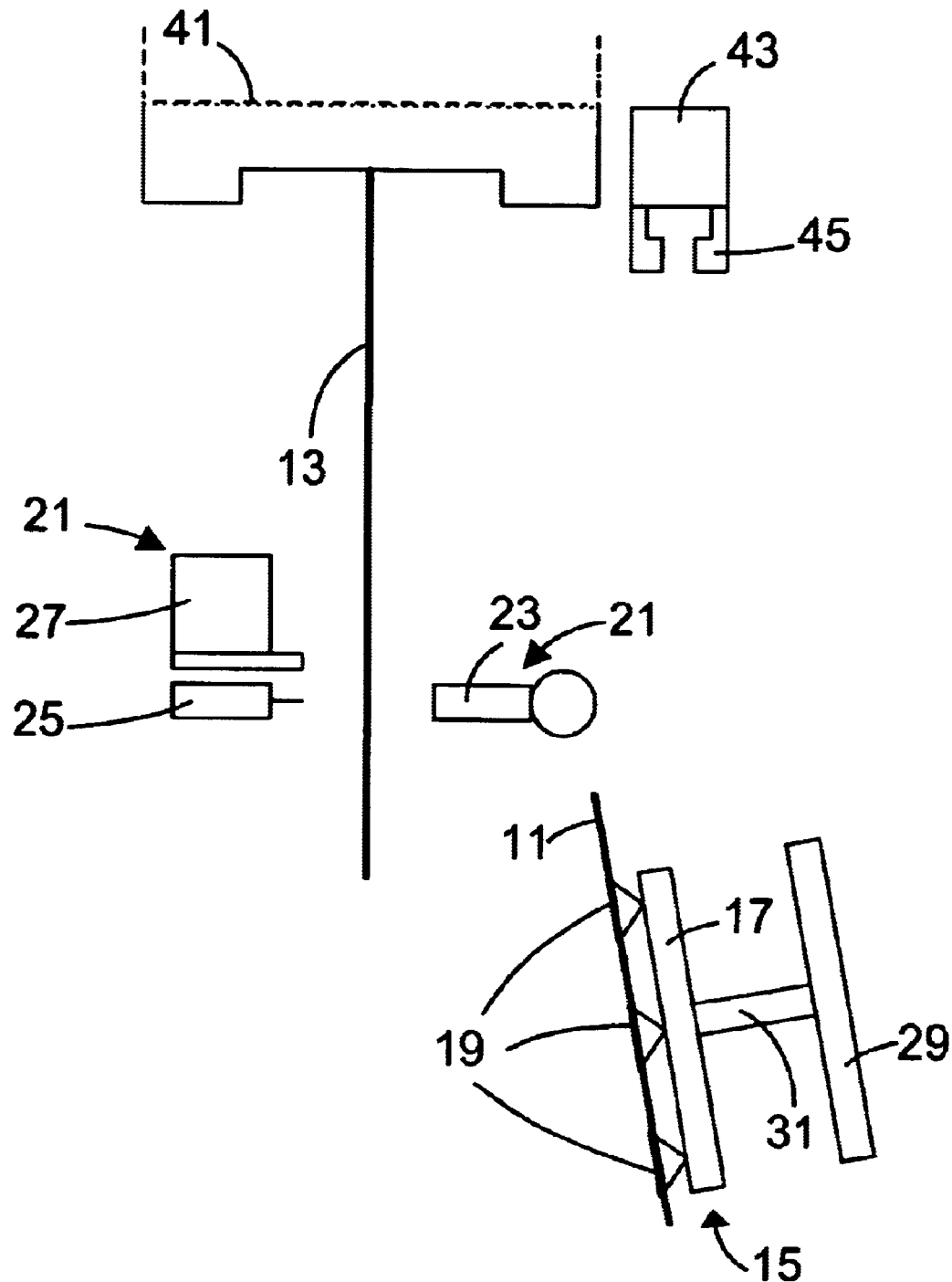
Figure 8:
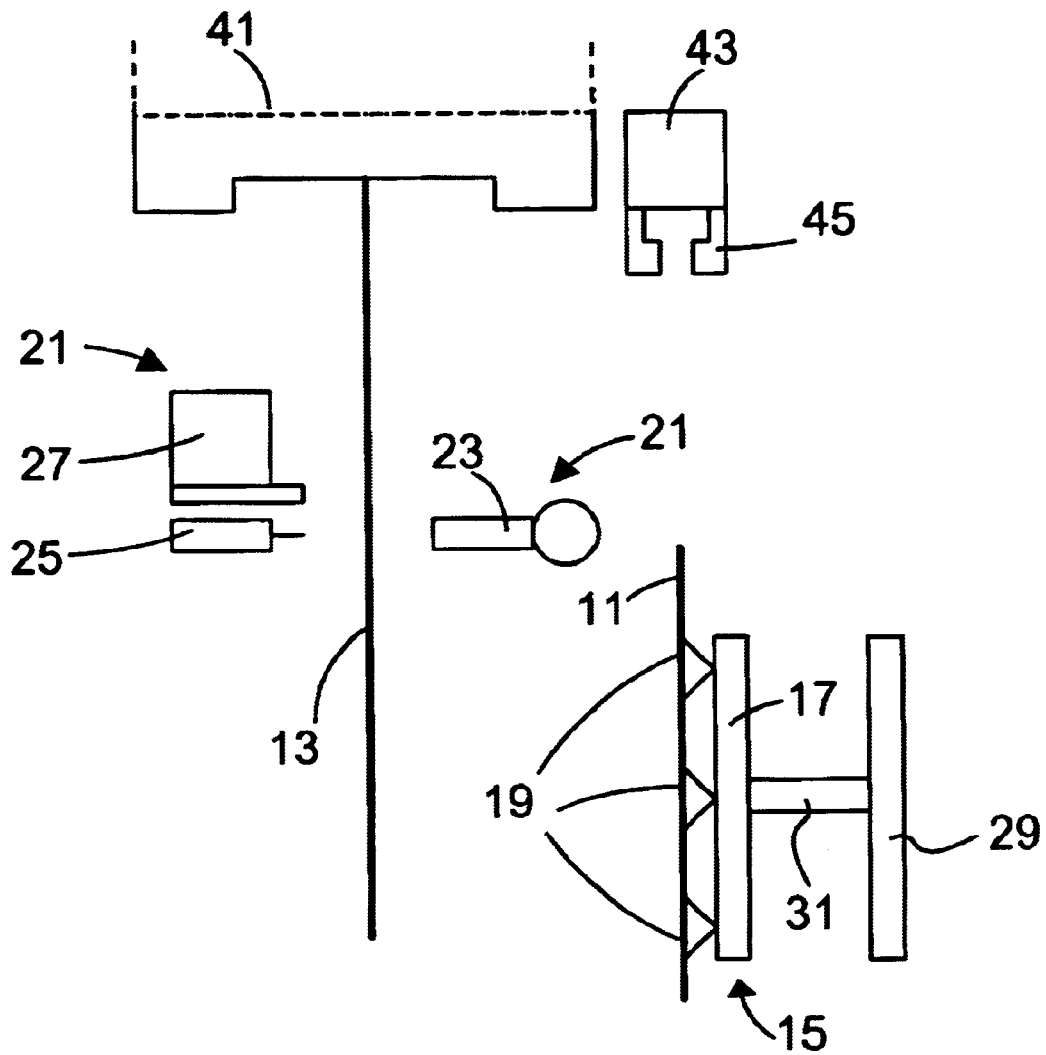
Figure 9:
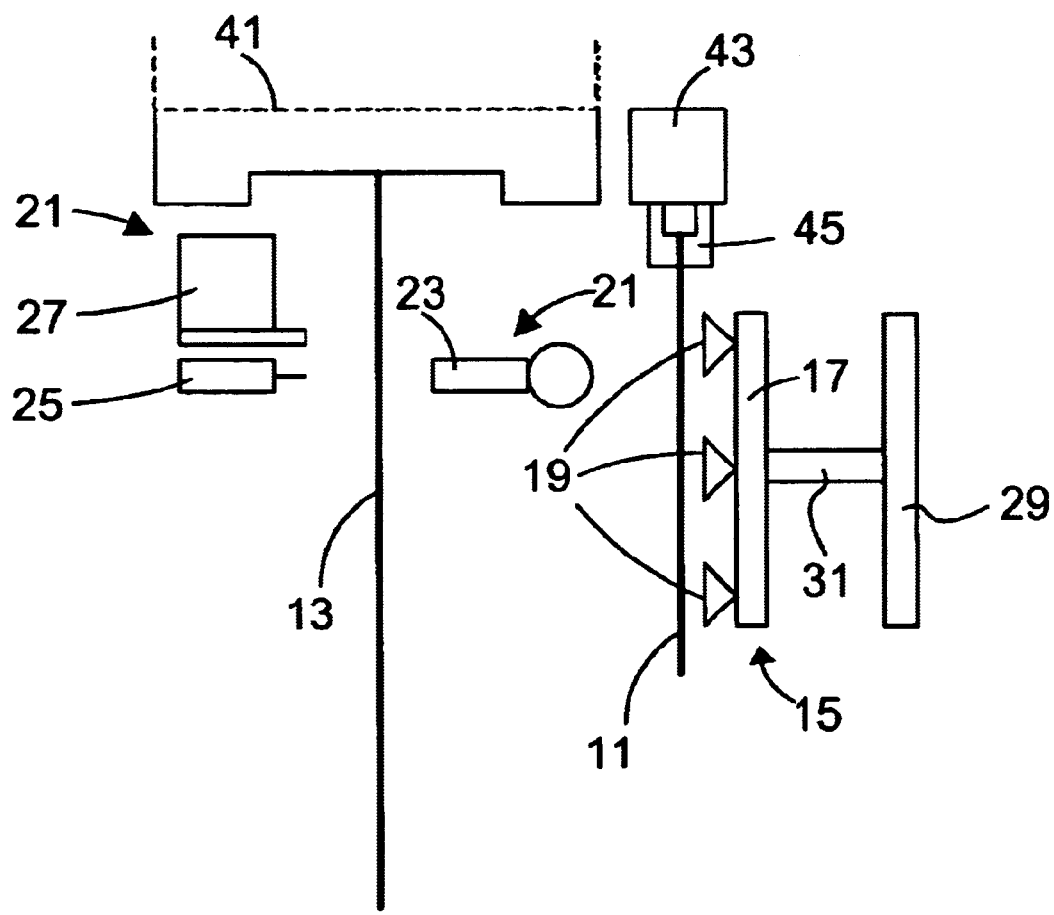

FIG. 5 illustrates the application of the bending moment. As shown in this figure, the bending moment is applied about the back side (unscored side) of the sheet using anvil 23 as a stop about which rotation takes place. Immediately upon separation, linear bearings 37a slide downward along linear rails 37b (see FIG. 12), thus automatically moving the trailing edge of the now separated pane away from the leading edge of the continually moving ribbon 13. In this way, the desired reduction in edge damage is achieved by the invention.

FIGS. 6–9 illustrate movement of the separated pane from the point of separation in FIG. 5 to the point at which pane grippers 45 of pane transport system 43 engage the pane. As discussed above, pane transport system 43 serves to move the separated pane to other processing stations in the glass manufacturing facility. The continued forward movement of ribbon 13 and the resetting of scoring assembly 21 is also shown in FIGS. 6–9.

Figure 10:
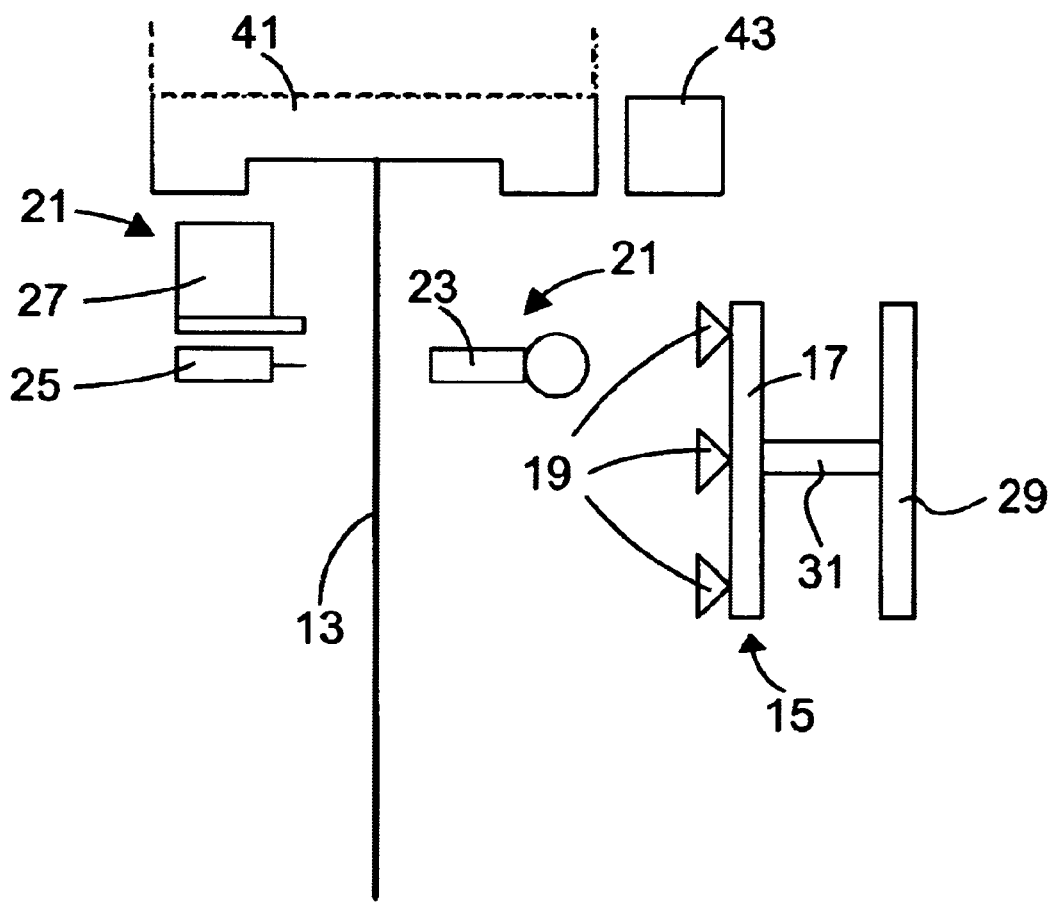
Figure 11:
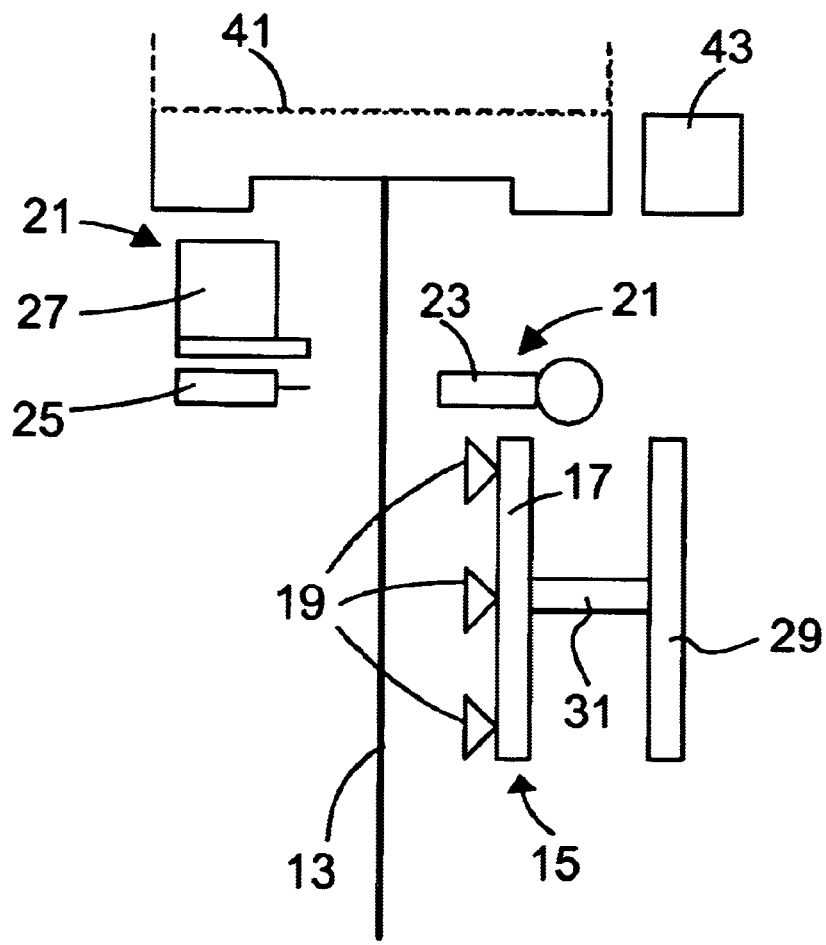

FIGS. 10 and 11 show the final steps in one cycle of the process, namely, the return of transporter 29 and its associated pane engaging assembly 15 and connector assembly 31 to a position adjacent to ribbon 13. Thereafter, the process repeats with each pane being reliably separated from ribbon 13 and delivered to pane transport system 43 without detrimental contact between the edge of the ribbon and the edge of the pane.

Although specific embodiments of the invention have been described and illustrated, it will be apparent to those skilled in the art that modifications and variations can be made without departing from the invention's spirit and scope. The following claims are thus intended to cover the specific embodiments set forth herein as well as such modifications, variations, and equivalents.

What is claimed is:

1. Apparatus for separating a pane of a brittle material from a moving sheet of the material along a separation line, said pane and said sheet having a width, said pane when separated having a length, said movement of the sheet being described by a vector, said apparatus comprising:

(a) a pane engaging assembly adapted to releasably engage the moving sheet within an area defined by the length and width of the to-be-separated pane;

(b) a transporter adapted to bring the pane engaging assembly into engagement with the moving sheet and to rotate that assembly about an axis which substantially coincides with the separation line, said rotation causing the pane to separate from the sheet; and (c) a connector assembly for connecting the pane engaging assembly and the transporter so that the pane engaging assembly moves relative to the transporter upon separation of the pane from the moving sheet so that the pane and the sheet do not contact each other once separation occurs.

2. The apparatus of claim 1 wherein the pane engaging assembly comprises a plurality of vacuum suction cups.

3. The apparatus of claim 1 wherein the transporter comprises an industrial robot.

4. The apparatus of claim 1 wherein, upon separation of the pane, the pane engaging assembly moves relative to the transporter in response to an applied force.

5. The apparatus of claim 1 wherein, upon separation of the pane, the pane engaging assembly moves relative to the transporter both in response to an applied force and under the force of gravity.

6. The apparatus of claim 1 wherein the brittle material is glass.

7. The apparatus of claim 1 wherein, upon separation of the pane, the pane engaging assembly moves relative to the transporter under the force of gravity.

8. The apparatus of claim 7 wherein the vector is substantially vertical.

9. The apparatus of claim 1 wherein:

(a) upon separation of the pane, the pane engaging assembly moves from a first position to a second position; and (b) the apparatus comprises a reset assembly for returning the pane engaging assembly to the first position.

10. The apparatus of claim 9 wherein the reset assembly is pneumatic.

* * * * *